(12) United States Patent
Daum

(10) Patent No.: US 9,077,004 B2
(45) Date of Patent: Jul. 7, 2015

(54) EXTENDED VALVE ORIFICE FOR FUEL CELL

(75) Inventor: Ronald J. Daum, Bloomfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 701 days.

(21) Appl. No.: 13/449,829

(22) Filed: Apr. 18, 2012

(65) Prior Publication Data

US 2013/0280628 A1   Oct. 24, 2013

(51) Int. Cl.
*H01M 8/04* (2006.01)
*H01M 8/10* (2006.01)

(52) U.S. Cl.
CPC ............ *H01M 8/04156* (2013.01); *Y02E 60/50* (2013.01); *H01M 8/04253* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 6,579,637 B1* | 6/2003 | Savage et al. | 429/414 |
| 2005/0053806 A1* | 3/2005 | Mukai et al. | 429/12 |
| 2009/0023019 A1* | 1/2009 | Koenekamp et al. | 429/13 |
| 2010/0279191 A1* | 11/2010 | Matsuura et al. | 429/443 |

* cited by examiner

*Primary Examiner* — Ula C Ruddock
*Assistant Examiner* — Tony Chuo
(74) *Attorney, Agent, or Firm* — Dinsmore & Shohl LLP

(57) ABSTRACT

An improved fuel cell system comprising a component designed to minimize or otherwise prevent the collection of water (and thus formation of ice at low temperatures) at valves or other anode exhaust flowpath control points. Thus, such system is configured to be operable under at least freeze start conditions. Also provided, in various embodiments, are methods of controlling ice blockage in a fuel cell system by, among other things, providing such a component.

20 Claims, 4 Drawing Sheets

EXTENDED VALVE ORIFICE FOR FUEL CELL

BACKGROUND

In a typical fuel cell system, hydrogen or a hydrogen-rich gas is supplied through a flowpath to the anode side of a fuel cell while oxygen (typically in the form of air) is supplied through a separate flowpath to the cathode side of the fuel cell. In one form of a fuel cell, called the proton exchange membrane (PEM) fuel cell, an electrolyte in the form of a proton-transmissive membrane is sandwiched between the anode and cathode to produce a layered structure commonly referred to as a membrane electrode assembly (MEA). Each MEA forms a single fuel cell, and many such single cells can be combined to form a fuel cell stack.

Water results from and is required for the operation of a fuel cell system, including a PEM-based system. Protons (derived from fuel present in the anode flowpath) are conducted from the anode through the PEM to the cathode, wherein such protons react with oxygen present in the cathode flowpath to produce water which is directed away from the anode and cathode. However, during operation of a fuel cell, water can build up in the anode flowpath. This may be due to, among other things, the diffusion of water from the fuel cell's cathode to the anode. If the amount of water present at the anode becomes too great, the anode can flood, causing damage to the fuel cell. Other forces, however, can cause the anode flowpath to completely dry out, which is also damaging because at least some water needs to be present in the fuel cell in order to maintain hydration of the PEM. Because water is omnipresent in an operable fuel cell system, problems can arise in cold temperature situations as prolonged exposure to such conditions may cause the water in the system to freeze. Ice in the fuel cell system, and in particular within the anode flowpath, can prevent proper performance of the system and may also damage the system.

Under freeze start conditions (typically when the internal fuel cell temperature has been at from 0° C. to −20° C. for a prolonged period of time), a fuel cell can be, or become, blocked with ice. If the anode or anode flowpath is blocked, the cell goes to negative voltages after consuming all of the hydrogen within the cell. Even after the load is removed, it takes a substantial period of time to get back to the open circuit voltage (OCV). Thus, the design of a fuel cell requires that attention be paid to the amount of hydration to ensure that neither too much nor too little water is present, and that the water that is present is managed in a manner that allows for proper performance of the fuel cell, particularly under freeze start conditions.

Water separators are one way to manage the amount of water present in an anode or anode flowpath. Current water separation technologies are configured to operate in unidirectional or bidirectional flow directions. However, such water separators comprise valves and other components, as well as design configurations, that can impact the successful start up of a fuel cell system. For example, while anode inlet valves of conventional water separators are fairly reliable, they can nevertheless become blocked with ice. In part, this can be due to the temperature of the valve remaining at freezing temperatures upon and after initial operation of a fuel cell system under freezing conditions. Therefore, there is an ongoing need for fuel cell system components that ensure reliable start-up and water management, particularly under freeze start conditions.

SUMMARY

In various embodiments, provided is an improved fuel cell system configured to prevent collection of water, ice, or both, in portions thereof and be operable under at least freeze start conditions. Such provided fuel cell system comprises a component designed to minimize or otherwise prevent the collection of water (and thus formation of ice at low temperatures) at valves or other flowpath control points. Also provided, in various embodiments, are methods of controlling ice blockage in a fuel cell system. Such provided methods comprise providing a component designed to minimize or otherwise prevent the collection of water (and thus formation of ice at low temperatures) at valves or other flowpath control points.

A provided fuel cell system of the present disclosure comprises (A) a fuel cell stack; (B) a water separator; (C) a valve operably coupled to an anode exhaust flowpath and said water separator, said valve configured to accept a water-containing exhaust from said flowpath and discharge said accepted exhaust to said water separator; and (D) a valve inlet throat comprising (i) a proximate end portion operably coupled to said valve; (ii) a substantially curved distal end portion having an orifice disposed therein, said orifice operably coupled to said flowpath; and (iii) a sidewall portion disposed between said proximate end portion and said distal end portion; wherein said distal end portion is configured such that any water, ice, or both, in said exhaust does not collect at said orifice or at said first portion of said valve.

A provided method of the present disclosure comprises (A) providing a fuel cell stack; (B) providing a water separator; (C) providing at least one valve operably coupled to an anode exhaust flowpath and said water separator, said valve configured to accept a water-containing exhaust from said flowpath and discharge said accepted exhaust to said water separator; and (D) providing a valve inlet throat comprising (i) a proximate end portion operably coupled to said valve; (ii) a substantially curved distal end portion having an orifice disposed therein, said orifice operably coupled to said flowpath; and (iii) a sidewall portion disposed between said proximate end portion and said distal end portion; wherein said distal end portion is configured such that any water, ice, or both, in said exhaust does not collect at said orifice or at said first portion of said valve.

BRIEF DESCRIPTION OF THE DRAWINGS

A more complete appreciation of the invention and the many embodiments thereof will be readily obtained as the same becomes better understood by reference to the following detailed description when considered in connection with the accompanying drawings, wherein.

DETAILED DESCRIPTION

Figure 1:
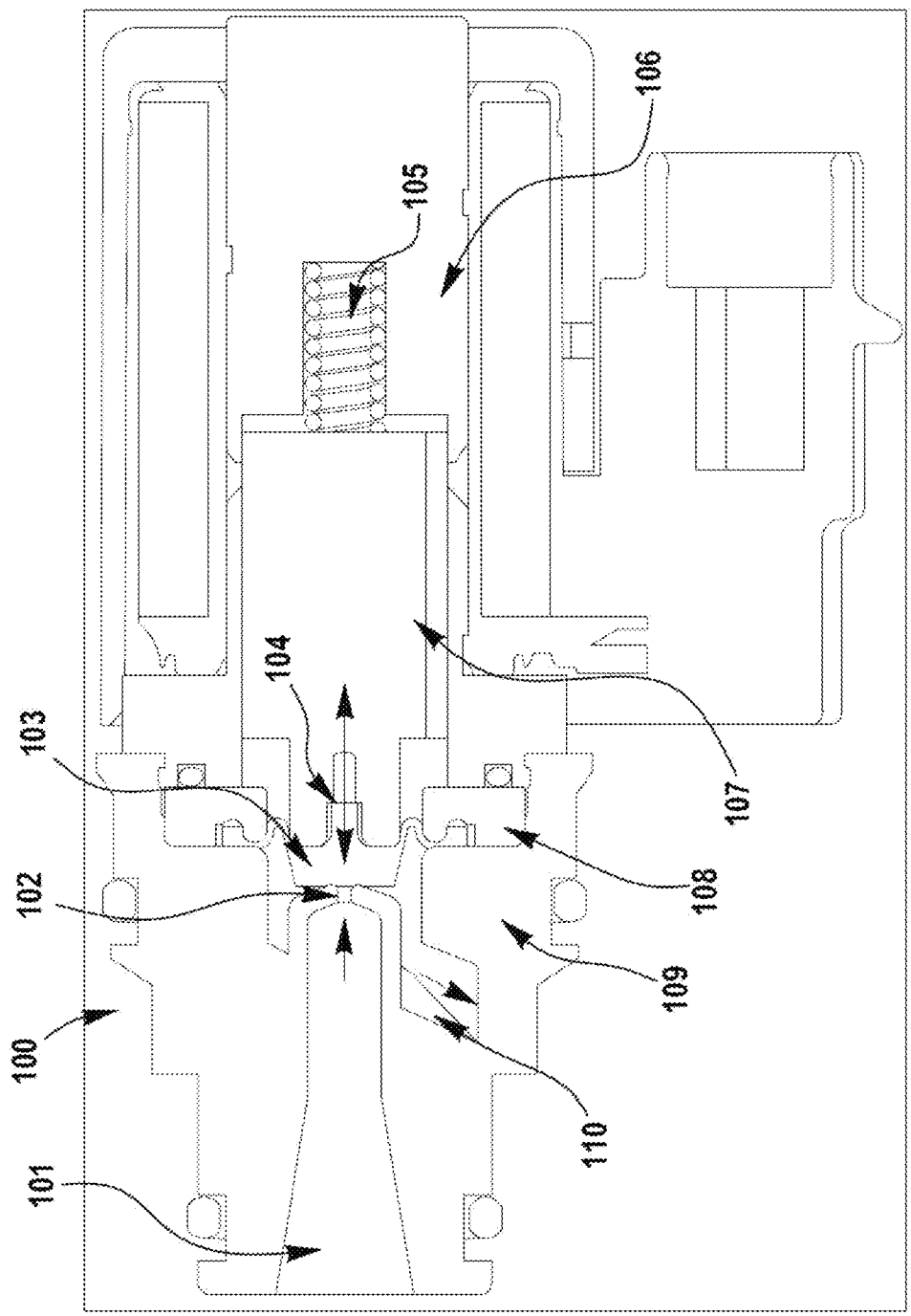
FIG. 1 illustrates certain components of a conventional (prior art) fuel cell system, namely those of a water separator assembly.

Specific embodiments of the present disclosure will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description herein is for describing particular embodiments only and is not intended to be limiting of the invention. As used in the specification and appended claims, the singular forms "a," "an," and "the" are intended to include the plural forms as well, unless the context clearly indicates otherwise.

Unless otherwise indicated, all numbers used in the specification and claims are to be understood as being modified in all instances by the term "about." Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In the various embodiments of the present disclosure, provided is an improved fuel cell system configured to prevent collection of water, ice, or both, in portions thereof and be operable under at least freeze start conditions. Also provided, in the various embodiments, are methods of controlling ice blockage in a fuel cell system.

A fuel cell system of the present disclosure comprises (A) a fuel cell stack; (B) a water separator; (C) a valve operably coupled to an anode exhaust flowpath and said water separator; and (D) a valve inlet throat configured such that any water, ice, or both, in said exhaust flowpath does not collect at said throat or at said valve. A fuel cell stack of the provided system comprises (i) a plurality of fuel cells, each comprising an anode; (ii) an anode exhaust flowpath operably coupled to the plurality of anodes and configured to direct the flow of a water-containing exhaust away from said anodes. A variety of suitable fuel cells and fuel cell stacks are known. A water separator of the provided system is operably coupled to the anode exhaust flowpath and is configured to remove at least a portion of water from exhaust in the flowpath. A variety of water separators are known, examples of which include those comprising a labyrinth separator, a double cyclone separator, a lamellar separator, or a wire mesh separator. A valve of the provided system comprises (i) a first portion operably coupled to the anode exhaust flowpath and configured to accept said exhaust therefrom, and (ii) a second portion operably coupled to the water separator and configured to discharge the accepted exhaust thereto. A variety of suitable valves are known.

In the various embodiments, the provided system represents an advancement over conventional systems due, at least in part, to the presence of a valve inlet throat comprising (i) a proximate end portion operably coupled to the first portion of the provided valve; (ii) a distal end portion having an orifice disposed therein, said orifice operably coupled to the anode exhaust flowpath; and (iii) a sidewall portion disposed between the proximate end portion and the distal end portion and defined around an axis. Preferably, the distal end portion has a substantially curved shape and the orifice is oppositely positioned on the axis from the first portion of the valve. In some embodiments, the distal end portion has a semi-spherical or convex curved outer surface. Such configuration assists in preventing any water, ice, or both, in the exhaust from collecting at the orifice. In addition to such preferred embodiments, other shapes of the distal end portion and locations of the orifice thereon are also contemplated, provided that the distal end portion remains configured such that any water, ice, or both, in the exhaust does not collect at the orifice. In some embodiments, the orifice may have a diameter of from about 1.2 mm to about 3 mm. Accordingly, orifices having a diameter of 1.2-1.4 mm, 1.4-1.6 mm, 1.6-1.8 mm, 1.8-2.0 mm, 2.0-2.2 mm, 2.2-2.4 mm, 2.4-2.6 mm, 2.6-2.8 mm, and 2.8-3 mm are specifically contemplated. Good results have been obtained with a diameter of 2 mm. In addition to such embodiments, the orifice of the distal end portion may comprise at least one land. While a variety of land sizes and configurations are specifically contemplated, good results have been obtained with a land of about 0.5 mm. With such a land, there is little surface area to which water droplets may adhere, thereby further preventing any water, ice, or both, from collecting at the orifice.

To further assist in preventing any water, ice, or both, in the exhaust from collecting at the first portion of the valve or at the orifice, the valve, valve inlet throat, or both, are preferably oriented away from a substantially vertical position by an angle of from about 30° to about 45°. Accordingly, the oriented position may be 30°, 31°, 32°, 33°, 34°, 35°, 36°, 37°, 38°, 39°, 40°, 41°, 42°, 43°, 44°, or 45° away from a substantially vertical position in such preferred embodiments. One of skill in the art will recognize, however, that other orientations of the valve, valve inlet throat, or both, are also contemplated. With such shape and orientation, it is difficult for water droplets to form at the curved outer surface of, and bridge the orifice in, the distal end portion. Instead, the tendency is for any water droplets formed to roll off a tangential edge. Thus, the valve inlet throat helps to prevent water droplets from ever reaching the valve that is coupled to the proximate end and the water separator, thereby allowing unrestricted exhaust flow upon fuel cell system start-up, even under freeze start conditions. As described herein, the distal end is operably coupled to the anode exhaust flowpath. In some embodiments, all or at least a portion of the distal end is located within the flowpath, thereby enabling warmth from the exhaust to help ensure that any ice formed on the outer or inner surface of the valve inlet throat rapidly undergoes a phase change. Moreover, pressure differential forces any frozen droplets to move away from the orifice. In some embodiments, the portion of the distal end located within the flowpath is oriented in the same direction as the exhaust flow. These are substantial improvements over conventional fuel cell system designs, wherein water droplets are funneled directly to the valve, thereby blocking exhaust flow when frozen.

A provided valve inlet throat comprises, in some embodiments, a substantially curved inner surface at the distal end portion and a cylindrical inner surface at the sidewall portion. Such surface configuration assists in preventing any water, ice, or both, that does breach the orifice in the distal end portion from collecting at the orifice itself, as well as collecting at or near the first portion of the valve. This is therefore, yet another design feature directed at preventing blockage of exhaust flow. In some embodiments, the inner surface at the distal end portion is concave. Other shapes of the inner surfaces are also contemplated, provided that the distal end portion remains configured such that any water, ice, or both, in the exhaust does not collect at the orifice or at the first portion of said anode inlet valve.

The valve inlet throat of the provided fuel cell system may be machined or otherwise suitably formed from plastics with low thermal conductivity, slight hydrophobicity, good surface finish, or a combination thereof. Good results have been obtained with Telfon® fluoropolymer resins (DuPont). In so doing, the distal end portion, proximate end portion, sidewall portion, or combination thereof may have varying dimensions and be one integrated piece or be assembled from a variety of pieces. For example, the sidewall portion may, in some embodiments, have an axial length of from about 15 mm to about 50 mm. Accordingly, lengths of 15-20 mm, 20-25 mm, 25-30 mm, 30-35 mm, 35-40 mm, 40-45 mm, and 45-50 mm are specifically contemplated. Good results have been obtained with a sidewall length of 35 mm. If such a sidewall portion has a substantially cylindrical shape, it may (in some embodiments) also have a diameter of from about 6 mm to about 12 mm, wherein said diameter may be uniform or variable along the length of the sidewall portion. Accordingly, sidewall diameters of 6-8 mm, 8-10 mm, and 10-12 mm are specifically contemplated. Good results have been obtained with a diameter of about 9.5 mm. Similarly, a proximate end portion may, in some embodiments, have a diameter of from about 6 mm to about 12 mm and be integral with or separate from the first portion of the valve. Accordingly, proximate end portion diameters of 6-8 mm, 8-10 mm, and 10-12 mm are specifically contemplated. Good results have been obtained with a diameter of about 9.5 mm.

In further embodiments, the provided fuel cell system may optionally comprise a heating element attached to or proximately located near the valve. When such optional heating element is employed, the heating element will increase the speed at which the valve heats under freeze start conditions, thereby further ensuring that any ice that manages to form at or near the valve will melt upon contact with the valve (or shortly thereafter), thereby preventing blockage. Moreover, ensuring that the valve heats quickly also helps to ensure that any water in the exhaust flowpath shortly after freeze start will not form ice upon making contact with the valve.

A provided method of the present disclosure comprises (A) providing a fuel cell stack; (B) providing a water separator; (C) providing at least one valve operably coupled to an anode exhaust flowpath and said water separator; and (D) providing a valve inlet throat configured such that any water, ice, or both, in said exhaust does not collect at said throat or at said valve. Providing a fuel cell stack comprises (i) providing a plurality of fuel cells, each comprising an anode; and (ii) providing an anode exhaust flowpath and operably coupling it to the plurality of anodes such that flow of a water-containing exhaust may be directed away from said anodes. Providing a water separator comprises operably coupling a suitable water separator to the anode exhaust flowpath and configuring it such that at least a portion of water from exhaust in the flowpath is removed. Examples of suitable water separators include those comprising a labyrinth separator, a double cyclone separator, a lamellar separator, or a wire mesh separator. Providing a valve comprises (i) providing a valve having a first portion and a second portion, (ii) operably coupling the first portion to the anode exhaust flowpath such that exhaust therefrom may be accepted, and (iii) operably coupling the second portion to the water separator such that the accepted exhaust may be dispatched thereto.

In the various embodiments, the provided methods represent an advancement over conventional methods due, at least in part, to the step of providing a valve inlet throat as described herein. Providing such valve inlet throat comprises (i) providing (a) a proximate end portion, (b) a distal end portion having an orifice disposed therein, and (c) a sidewall portion disposed between the proximate end portion and the distal end portion and defined around an axis; (ii) operably coupling the proximate end portion to the first portion of the provided valve; and (iii) operably coupling the orifice to the anode exhaust flowpath. Preferably, the first portion of the valve and the orifice are oppositely positioned on said axis, and the distal end portion has a substantially curved shape. In some embodiments, the distal end portion has a semi-spherical or convex curved outer surface. Such configuration assists in preventing any water, ice, or both, in the exhaust from collecting at the orifice and at the first portion of the valve. In addition to such preferred embodiments, other shapes of the distal end portion and locations of the orifice thereon are also contemplated, provided that the distal end portion remains configured such that any water, ice, or both, in the exhaust does not collect at the orifice or at the first portion of said anode inlet valve. In addition to such embodiments, the orifice of the distal end portion may comprise at least one land. A variety of land sizes and configurations are specifically contemplated.

To further assist in preventing any water, ice, or both, in the exhaust from collecting at the orifice and at the first portion of the valve, in some embodiments, the provided methods comprise orienting the valve, valve inlet throat, or both, away from a substantially vertical position by an angle of from about 30° to about 45°. Accordingly, the oriented position may be 30°, 31°, 32°, 33°, 34°, 35°, 36°, 37°, 38°, 39°, 40°, 41°, 42°, 43°, 44°, or 45° away from a substantially vertical position. One of skill in the art will recognize, however, that orienting the valve, valve inlet throat, or both, by other angles are also contemplated to be within the provided methods. With such shape and orientation, it is difficult for water droplets to form at the outer surface of, and bridge the orifice in, the distal end portion. Instead, the tendency is for any water droplets formed to roll off a tangental edge. Thus, providing such a valve inlet throat to a fuel cell system helps to prevent water droplets from ever reaching the valve that is coupled to the water separator, thereby allowing unrestricted exhaust flow upon fuel cell system start-up, even under freeze start conditions. As described herein, the methods comprise operably coupling the distal end portion to the anode exhaust flowpath. In some embodiments, all or at least a portion of the distal end may be disposed within the flowpath, thereby enabling warmth from the exhaust to help ensure that any ice formed in the valve inlet throat undergoes a phase change. Moreover, pressure differential forces any frozen droplets to move away from the orifice. In some embodiments, the provided methods comprise orienting the distal end portion that is disposed within the flowpath in the same direction as the exhaust flow. These are substantial improvements over conventional fuel cell system designs and methods, wherein water droplets are funneled directly to the valve, thereby blocking exhaust flow when frozen.

In some embodiments, the methods comprise providing the valve inlet throat with a substantially curved inner surface at the distal end portion and a cylindrical inner surface at the sidewall portion. Such surface configuration assists in preventing any water, ice, or both, that does breach the orifice in the distal end portion from collecting at the orifice itself, as well as collecting at or near the first portion of the valve. This is therefore, yet another design feature directed at preventing blockage of exhaust flow. In some embodiments, the inner surface at the distal end portion is concave. However, providing other shapes to the inner surfaces is also contemplated, provided that the distal end portion remains configured such that any water, ice, or both, in the exhaust does not collect at the orifice or at the first portion of said anode inlet valve.

The valve inlet throat of the provided fuel cell system may be machined or otherwise suitably formed from plastics with low thermal conductivity, slight hydrophobicity, good surface finish, or a combination thereof. Good results have been obtained with Telfon® fluoropolymer resins (DuPont). In so doing, the distal end portion, proximate end portion, sidewall portion, or combination thereof may have varying dimensions and be one integrated piece or be assembled from a variety of pieces. For example, the sidewall portion may, in some embodiments, have an axial length of from about 15 mm to about 50 mm. If such a sidewall portion has a substantially cylindrical shape, it may (in some embodiments) also have a diameter of from about 6 mm to about 12 mm, wherein said diameter may be uniform or variable along the length of the sidewall portion. Similarly, a proximate end portion may, in some embodiments, have a diameter of from about 6 mm to about 12 mm and be integral with or separate from the first portion of the valve.

In further embodiments, the provided methods may optionally comprise attaching a heating element to or proximately to the valve. When such optional heating element is employed, the heating element will increase the speed at which the valve heats under freeze start conditions, thereby further ensuring that any ice that manages to form in the exhaust flowpath at or near the valve will melt upon or shortly after contact with the valve, thereby preventing blockage. Moreover, by ensuring that the valve heats quickly helps to ensure that any water in the exhaust flowpath shortly after freeze start will not form ice upon making contact with the valve.

Some of the embodiments described herein may be better understood by reference to FIGS. 1-5, which are offered for illustrative purposes only and which one of skill in the art will recognize are not meant to be limiting. FIG. 1 illustrates a portion of a conventional (prior art) fuel cell system, namely a water separator assembly 100. Exhaust from the anode stack (anode exhaust flowpath) travels into the assembly 100 via the conventional (prior art) valve inlet throat 101, through a flow orifice 102 and to a valve 104. With such a conventional design, the flow orifice 102 is a control point in the exhaust flow. Moreover, because the conventional valve inlet throat 101 is designed like a funnel, water droplets from the exhaust can collect at or near the orifice 102. Under freezing conditions, any collected water can freeze, thereby blocking exhaust flow. Such blockage can also be exacerbated by the cooling temperature effect of the valve 104. Under freeze start conditions, the valve 104 temperature does not rise until warm exhaust reaches it. Because the valve 104 is proximate to the orifice 102, it can act as a heat sink, having a cooling effect on the orifice 102, thereby delaying melting of ice blockage. Such delay can have damaging effects on the fuel cell system.

For reference, the assembly 100 further comprises a diaphragm seal 103, water separator coil windings 105, plunger housing 106, plunger 107, seal retainer 108, plastic valve interface (with o-ring seals) 109, and an outlet 110 that is coupled to the cathode stack (cathode input flow). Such components are the same or similar to the ones of the provided fuel cell system and associated assembly illustrated in FIG. 2.

Figure 2:
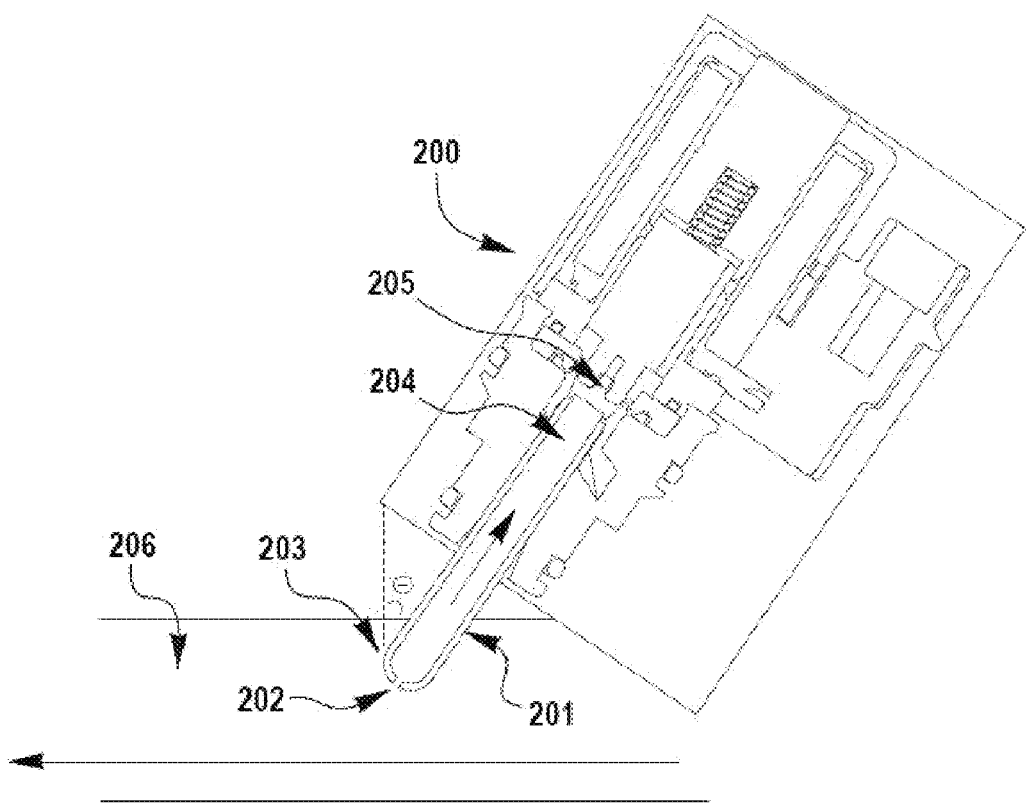
FIG. 2 illustrates one example of certain components of a provided fuel cell system, namely those of a water separator assembly.

FIG. 2 illustrates certain embodiments of the provided fuel cell system and associated water separator assembly 200. The novel valve inlet throat 201 comprises a substantially curved distal end portion 203 having an orifice 202 disposed therein. As shown, the orifice 202 and distal end portion are disposed within the anode exhaust flowpath 206 and are oriented in the direction of exhaust flow. As such, the distal end portion and control point orifice 202 are readily warmed by the exhaust, thereby helping to rapidly melt any ice present upon freeze start. Exhaust flows through the orifice 202 and distal end portion 203, through the sidewall portion (not labeled), to the proximate end portion 204, and is ultimately delivered to the valve 205. Because there is no flow orifice at the proximate end portion 204, there is nowhere for water/ice droplets to collect. The generally cylindrical shape of the valve inlet throat 201 also assists in ensuring that water/ice do not collect at or near the valve 205. As shown, the valve 205 and inlet throat 201 are oriented away from a substantially vertical position, thereby helping to prevent any blockage of the orifice 202 or valve 205 with water/ice. The substantially curved nature of the distal end portion 203 also assists in ensuring that water/ice does not collect at the orifice 202 because the semi-spherical or convex outer surface (not labeled) provides little for water droplets to adhere to (the tendency is to drop from a tangental edge). Additionally, the concave inner surface (not labeled) of the distal end portion 203 helps to prevent collection of water/ice at the orifice 202.

Figure 3:
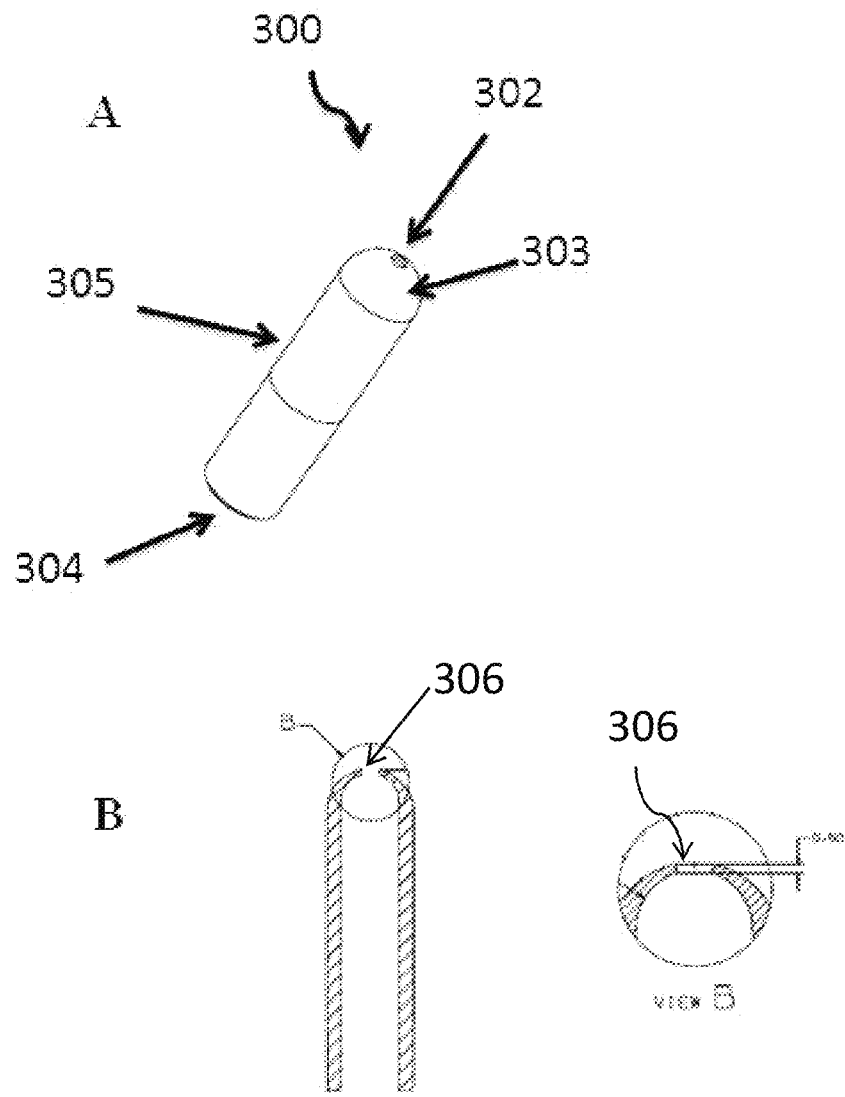
FIG. 3 illustrates one example of a provided valve inlet throat.

Certain embodiments of a provided valve inlet throat can also be understood with reference to FIG. 3. The valve inlet throat 300 shown in FIG. 3A comprises (i) a proximate end portion 304, which is configured to be coupled to a first portion of a valve (i.e. the inlet portion of a valve); (ii) a distal end portion 303 having an orifice 302 disposed therein; and (iii) a sidewall portion 305 disposed between the proximate end portion 304 and the distal end portion 303 and defined around an axis (not labeled). The distal end portion 303, proximate end portion 304, and sidewall portion 305 may be one integral piece or may be more than one coupled piece. The distal end portion 303 shown has a semi-spherical or convex curved outer surface (not labeled), and the orifice 302 is oppositely positioned on the axis from the proximate end portion 304. Thus, in some embodiments, the orifice 302 and the first portion of the valve (not shown) will also be oppositely positioned on the axis. In some embodiments, the orifice 302 may comprise at least one land 306, as shown in FIG. 3B. Good results have been obtained with a thin land 306 (for example, 0.5 mm) that spans the depth of the orifice 302.

Figure 4:
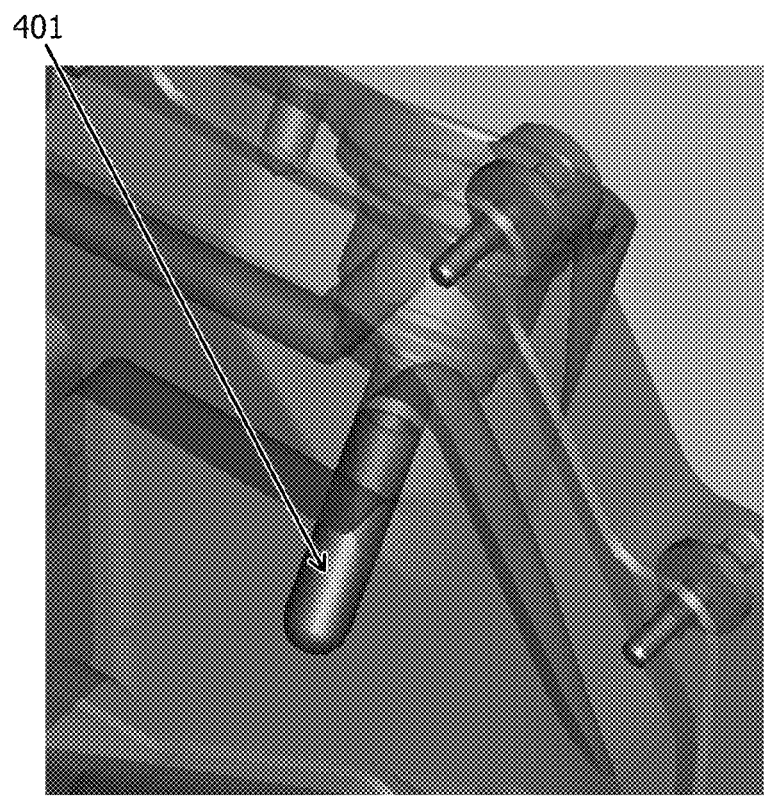
FIG. 4 is an illustration of one example of a provided inlet throat as assembled in a water separator housing.
Figure 5:
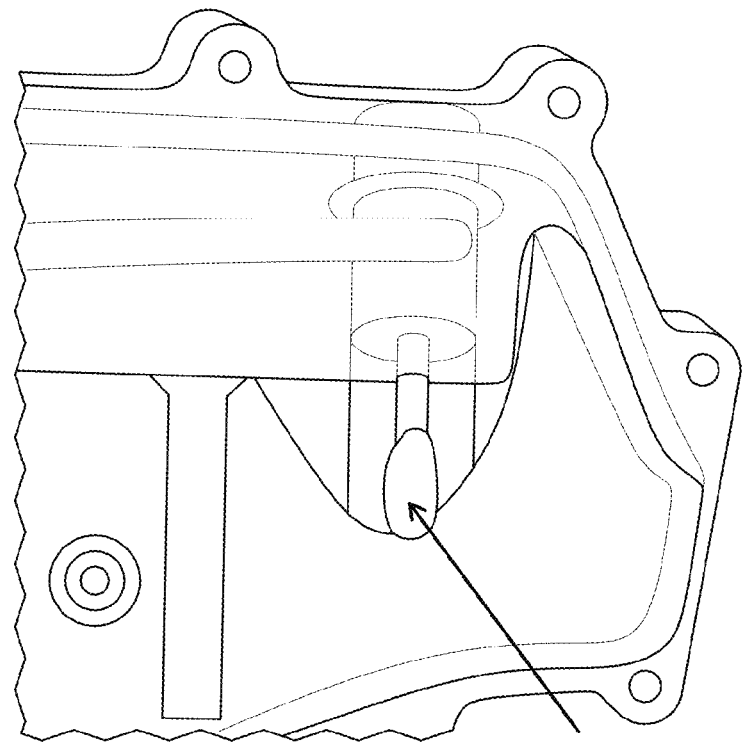
FIG. 5 is a photograph of one working prototype valve inlet throat as assembled in a water separator housing.

FIG. 4 illustrates a provided valve inlet throat 401 in the context of a water separator housing (not labeled), and FIG. 5 is a photograph of one example of a provided valve inlet throat 501 used in a prototype.

This application should not be considered limited to the specific figures, embodiments, or examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention.

What is claimed is:

1. A fuel cell system, comprising:
   (A) a fuel cell stack having (i) a plurality of fuel cells, each comprising an anode; and (ii) an anode exhaust flowpath operably coupled to said anodes and configured to direct flow of a water-containing exhaust away from said anodes;
   (B) a water separator operably coupled to said flowpath and configured to remove at least a portion of water from said exhaust;
   (C) a valve comprising (i) a first portion operably coupled to said flowpath and configured to accept said exhaust therefrom, and (ii) a second portion operably coupled to said water separator and configured to discharge said accepted exhaust thereto; and (D) a valve inlet throat comprising (i) a proximate end portion operably coupled to said first portion of said valve; (ii) a substantially curved distal end portion having an orifice disposed therein, said orifice operably coupled to said flowpath; and (iii) a sidewall portion disposed between said proximate end portion and said distal end portion and defined around an axis;

wherein the fuel cell system is configured to operate under at least freeze start conditions.

2. The system of claim 1, wherein said first portion of said anode inlet valve and said orifice are oppositely positioned on said axis.

3. The system of claim 1, wherein said distal end portion is configured such that any water, ice, or both, in said exhaust does not collect at said orifice or at said first portion of said anode inlet valve.

4. The system of claim 3, wherein said valve, inlet throat, or both, are oriented away from a substantially vertical position by an angle of from about 30° to about 45°.

5. The system of claim 4, wherein said inlet throat comprises a substantially concave curved inner surface at said distal end portion and a cylindrical inner surface at said sidewall portion.

6. The system of claim 5, wherein said inlet throat comprises a substantially convex curved outer surface at said distal end portion.

7. The system of claim 6, wherein said orifice comprises at least one land.

8. The system of claim 1, wherein said sidewall portion has an axial length of from about 15 mm to about 50 mm.

9. The system of claim 1, wherein said inlet throat is machined or otherwise suitably formed from fluoropolymer resin.

10. The system of claim 1, wherein said inlet throat is integral with said first portion of said valve.

11. The system of claim 1, wherein said water separator comprises a labyrinth separator, a double cyclone separator, a lamellar separator, or a wire mesh separator.

12. A method of controlling anode exhaust flowpath ice-blockage in a fuel cell system, comprising:

(A) providing a fuel cell stack having an anode exhaust flowpath operably coupled to a plurality of fuel cells and configured to direct flow of a water-containing exhaust;

(B) providing a water separator operably coupled to said anode exhaust flowpath and configured to remove at least a portion of water from said exhaust;

(C) providing at least one valve comprising (i) a first portion operably coupled to said flowpath and configured to accept said exhaust therefrom, and (ii) a second portion operably coupled to said water separator and configured to discharge said accepted exhaust thereto; and (D) providing a valve inlet throat comprising (i) a proximate end portion operably coupled to said first portion of said valve; (ii) a substantially curved distal end portion having an orifice disposed therein, said orifice operably coupled to said flowpath; and (iii) a sidewall portion disposed between said proximate end portion and said distal end portion and defined around an axis;

wherein said distal end portion is configured such that any water, ice, or both, in said exhaust does not collect at said orifice or at said first portion of said anode inlet valve.

13. The method of claim 12, wherein said first portion of said anode inlet valve and said orifice are oppositely positioned on said axis.

14. The method of claim 12, comprising orienting said valve, inlet throat, or both, away from a substantially vertical position by an angle of from about 30° to about 45°.

15. The method of claim 14, wherein said inlet throat comprises a substantially concave curved inner surface at said distal end portion, and a cylindrical inner surface at said sidewall portion.

16. The method of claim 14, wherein said inlet throat comprises a substantially convex curved outer surface at said distal end portion.

17. The method of claim 12, wherein said orifice comprises at least one land.

18. The method of claim 12, wherein said sidewall portion has an axial length of from about 15 mm to about 50 mm.

19. The method of claim 12, comprising machining or otherwise suitably forming said inlet throat from fluoropolymer resin.

20. The method of claim 12, wherein said inlet throat is integral with said first portion of said valve.

* * * * *